UNITED STATES PATENT OFFICE.

EUGENE S. COCHRAN, OF NEW YORK, N. Y., ASSIGNOR OF ONE-HALF TO JOHN T. McCROSSON, OF HONOLULU, HAWAII.

METHOD OF PRODUCING A CANNERY SIRUP FOR THE CANNING AND PRESERVING OF ALL FRUITS AND THE PRODUCTS THEREOF.

No Drawing.  Application filed August 19, 1924. Serial No. 733,006.

The present method of making the sirup used in connection with the canning and preserving of all fruits is to take refined sugar and melt it with sufficient water to give the desired degree of sweetness or sucrose contents. In the process of making the refined sugar, from which the cannery sirup is made, all the reducing sugars and an equal amount of grainable sugar are lost and are recoverable only in the form of molasses which is unsuited for cannery purposes.

By my novel method, which in its broad aspects is a division of an application, filed by me November 23d, 1922, Serial No. 602,884, all the sucrose and reducing sugars are retained in the cannery sirup prepared, as it is, in an entirely new way with all the saccharine contents of the juice concentrated in the finished product. By this method a saving of much time, labor and about 15% in sugar is effected over the present system of producing cannery sirup.

By my method the juice as extracted from sugar cane or beet root is strained in the usual manner through a plate strainer with 200 to 250 openings per square inch. As the juice is strained without liming or other treatment, it is taken by a juice pump and forced through a closed heater under a pressure of 20 to 30 lbs. per square inch and a temperature of 220° to 230° F. After passing through the heater, the juice is conducted through a filter press or filter under the same pressure and preferably by the pump taking the juice from the strainer box and forcing it through the heater.

The heaters and filters are so arranged that one set may be cleaned while the others are in operation.

The juice as it leaves the filter press will be practically free of all impurities. To further refine and decolorize the juice about ½% of porous infusorial earth and about 1% of bone black or other clarifying and decolorizing agent is now used and the juice forced through the filter press again; the juice after this treatment will be thoroughly refined and very clear, and suitable for concentrating in the vacuum pan to any saccharine density from 10 to 60 Brix as may be desired for various cannery needs.

The inversion of the grainable sugar in the juice through acidity or otherwise is not objectionable as the juice will not be concentrated above 60 Brix and the reducing sugars are as desirable in a cannery sirup as pure sucrose. The utilization of all the grainable and ungrainable sugars in the juice, for the production of a cannery sirup being the foundation of my claim for a patent on my novel cannery sirup.

My novel sirup is adapted for use in the canning and preserving of all fruits and the products thereof, said fruits being first prepared for canning in the usual manner and then placed in the containers, and treated with my novel hereindescribed sirup, after which the containers filled with the fruit and sirup are sealed in the usual manner.

It will be apparent that the use of my novel sirup saves time and labor heretofore expended in converting the juice into refined sugar and the remelting thereof with water, to produce the cannery sirup now in use, and I further save about 15% of saccharine matter heretofore not utilized.

The sirup thus produced because of retaining all the invert or ungrainable saccharine of the vegetable juices furnishes a cannery sirup entirely different from that at present or heretofore used for canning of fruits and gives a most agreeable and totally unexpected flavor to the fruit treated with this sirup.

It will be apparent that I have devised a novel and useful method of producing a cannery sirup which embodies the features of advantage enumerated as desirable in the statement of the invention and the above description, and while, I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention what I claim as new and useful and desire to secure by Letters Patent, is:—

The method of producing a cannery sirup from vegetable juices, which consists first, in straining the raw juice without liming or other treatment, next forcing said juice through a closed heater at a temperature above the boiling point, and at a pressure of 20 to 30 pounds to the square inch, next conducting the juice through a filter press under substantially the same pressure, next refining and decolorizing said juice, next refiltering said juice and lastly concentrating said filtrate to the desired density.

EUGENE S. COCHRAN.